UNITED STATES PATENT OFFICE.

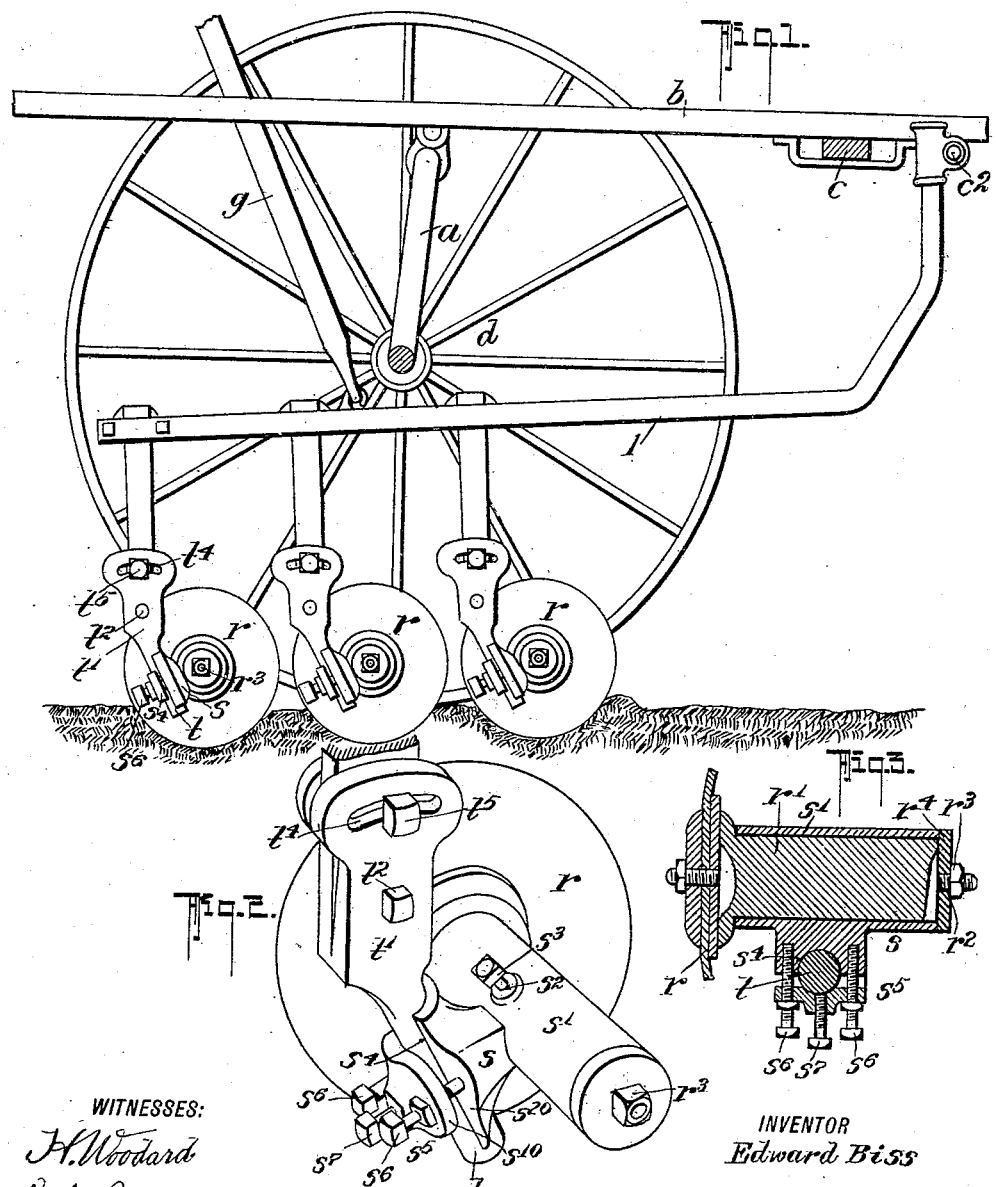

EDWARD BISS, OF SHERMAN, SOUTH DAKOTA.

CULTIVATOR.

No. 908,383.  Specification of Letters Patent.  Patented Dec. 29, 1908.

Original application filed April 17, 1908, Serial No. 427,616. Divided and this application filed July 13, 1908.
Serial No. 443,386.

*To all whom it may concern:*

Be it known that I, EDWARD BISS, residing at Sherman, in the county of Minnehaha and State of South Dakota, have invented certain new and useful Improvements in Cultivators, of which the following is a specification.

This invention, which generally relates to improvements in cultivators, more specifically has for its object to provide an improved construction of the disk or plow standard, and the disk plow rotatably mounted thereon, and the means whereby the said rotary plow or member can be conveniently, quickly and effectively adjusted and set to the varied conditions for which the complete machine shown in my co-pending application No. 427616, filed April 17, 1908, for cultivators, may be adapted, my said present application being a divisional part of the pending application referred to, and it consists in the peculiar construction and novel arrangement of parts, all of which will be hereinafter fully described, specifically pointed out in the appended claims and illustrated in the accompanying drawing, in which:—

Figure 1, is a longitudinal section of a portion of a cultivator having a gang of rotatably mounted disk plows with my improvements applied. Fig. 2, is a detail perspective view of one of the plow disks, a part of the standard therefor, and the adjustable devices for connecting the plow with the standard. Fig. 3, is a detail horizontal section taken through a disk shaft, the tubular bearing therefor and the clamping device hereinafter referred to.

In the drawings, in which I have illustrated so much of a cultivator framing necessary to properly disclose my improvements, $a$ designates the arched axle, $b$ one of the upper frame beams, $d$ one of the sulky wheels, and $c$ the cross or draft bar, said parts being of any approved construction, since they form, *per se*, no part of my invention.

$l$ designates the cultivator beam, the forward end of which is bent forwardly and connected with the frame beam $b$ by means of a coupling hinge $c^2$ and the rear end is hinged on a suspension bar $g$ that may be connected to the beam $b$ in any approved manner but preferably as shown in my co-pending application referred to. The beam $b$ is coupled to the upper end of the arched axle $a$ that carries the wheel D as shown in Fig. 1.

In the practical application of my invention a gang of plow disks are pendently supported from the beam $l$, as shown in Fig. 1, but since all the disks are mounted on the beam in the same manner, a detailed description of but one of the disks will be given.

Referring now more particularly to Figs. 2 and 3, it will be noticed the disk, designated $r$, has a stub shaft $r'$ that journals in the tubular member $s'$ integrally formed with a bracket section $s$, presently again referred to, and the said shaft $r'$ has a reduced threaded end $r^2$ for the nut $r^3$ that holds the washer $r^4$ against the tubular member $s'$, the latter having an oil receiving aperture $s^2$ usually closed by a screw plug $s^3$, as shown.

The bracket member $s$ has a concaved seat $s^4$ that opposes a clamp member $s^5$ that has a similar seat, the said opposing members $s$ and $s^5$ forming a socket clamp for adjustably engaging the pendent shank $t$ of a bifurcated bracket $t'$, the adjustment of the members $s$ and $s^5$ being effected by the clamp nuts $s^6$—$s^6$ that engage the lateral or ear portions $s^{10}$ and $s^{20}$ of the members $s$ and $s^5$ and the clamp nut $s^7$ that engages the member $s$ and the shank $t$. The bifurcated bracket $t'$ is fulcrumed at $t^2$ on the lower end of the plow standard that is pendently attached to the beam $l$ and the upper end thereof is segmentally slotted as at $t^4$ to ride on the clamping bolt $t^5$.

By reason of the construction of the parts shown and described, the disk plows can be quickly and conveniently set to the position desired, vertically, by adjustably setting the tubular member $s'$ in the direction of the length of the shank $t$ and at an angle with respect to the beam and standard by loosening the bolt and nut devices $t^5$ and swinging the bracket $t'$ on its fulcrum bolt $t^2$ and again tightening the said devices $t^5$.

From the foregoing, taken in connection with the drawings, the advantages and the complete construction of my invention will be readily apparent to those skilled in the use of gang cultivators or plows, since the arrangement of the several parts is such that they can be readily applied for use on any of the well-known types of gang plows or cultivator frames.

Having thus described my invention, what I claim is:

The combination with the cultivator beam, a standard pendent therefrom and a bracket member comprising a bifurcated head, a pendent shank, said head having a segmental slot, means for clamping the slotted head to its adjusted positions on the standard; of a tubular bearing having an integral clamping member formed with a concaved seat and lateral ears, an opposing clamping member having a concaved seat and lateral ears, clamp screw bolts for engaging the ears of the two members, and a clamp screw on the said opposing clamping member for engaging the shank of the bracket for the purposes set forth.

EDWARD BISS.

Witnesses:
AUGUST JOHNSON,
W. O. BRENNAN.